United States Patent
Ford

(10) Patent No.: US 7,435,179 B1
(45) Date of Patent: Oct. 14, 2008

(54) LOCATION-BASED AUTHORIZATION OF GAMING ACTION IN WIRELESS COMMUNICATION GAMING DEVICES

(75) Inventor: Jason Ford, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 559 days.

(21) Appl. No.: 10/989,447

(22) Filed: Nov. 15, 2004

(51) Int. Cl.
- A63F 17/00 (2006.01)
- A63F 9/24 (2006.01)
- G06F 17/00 (2006.01)
- G06F 19/00 (2006.01)

(52) U.S. Cl. .............. 463/42; 463/1; 463/49; 463/51; 434/11; 434/21; 434/22

(58) Field of Classification Search ............. 463/40–42, 463/1, 49, 51; 434/11, 21, 22
See application file for complete search history.

(56) References Cited

U.S. PATENT DOCUMENTS

| | | | | |
|---|---|---|---|---|
| 4,470,817 A | * | 9/1984 | Diehl et al. | 434/22 |
| 6,302,796 B1 | * | 10/2001 | Lebensfeld et al. | 463/51 |
| 6,320,495 B1 | * | 11/2001 | Sporgis | 340/323 R |
| 6,398,555 B1 | * | 6/2002 | Gerber et al. | 434/22 |
| 6,530,841 B2 | | 3/2003 | Bull et al. | 463/42 |
| 6,561,809 B1 | * | 5/2003 | Lynch et al. | 434/16 |
| 6,569,011 B1 | * | 5/2003 | Lynch et al. | 463/1 |
| 6,863,610 B2 | * | 3/2005 | Vancraeynest | 463/41 |
| 7,338,375 B1 | * | 3/2008 | Small | 463/39 |
| 2001/0029011 A1 | * | 10/2001 | Dagani et al. | 434/11 |
| 2002/0006825 A1 | * | 1/2002 | Suzuki | 463/40 |
| 2002/0111201 A1 | * | 8/2002 | Lang | 463/2 |
| 2002/0147049 A1 | * | 10/2002 | Carter | 463/42 |
| 2003/0036428 A1 | * | 2/2003 | Aasland | 463/29 |
| 2003/0144047 A1 | * | 7/2003 | Sprogis | 463/9 |
| 2003/0190956 A1 | * | 10/2003 | Vancraeynest | 463/40 |
| 2003/0224855 A1 | * | 12/2003 | Cunningham | 463/41 |
| 2004/0058732 A1 | * | 3/2004 | Piccionelli | 463/42 |
| 2005/0049022 A1 | * | 3/2005 | Mullen | 463/1 |

* cited by examiner

*Primary Examiner*—Robert E Pezzuto
*Assistant Examiner*—Milap Shah

(57) ABSTRACT

A gaming server periodically receives location information from a plurality of distributed gaming devices. Such devices can take the form of cellular telephones or other wireless communications devices equipped with a GPS transceiver. When the gaming server determines that a gaming device is within a predetermined range of another gaming device, it sends an authorization message such as an "in-range" message to one or both of the devices within range of each other. The users of the device(s) receiving the in-range message are then authorized to "shoot" the other user, e.g., by taking a picture of them, pointing a laser at them or other gaming action that may be specified by the rules of the game. The gaming action could also be initiating a game.

14 Claims, 8 Drawing Sheets

US 7,435,179 B1

LOCATION-BASED AUTHORIZATION OF GAMING ACTION IN WIRELESS COMMUNICATION GAMING DEVICES

BACKGROUND

This invention relates generally to the field of games, for example on where one game player "shoots" another person (e.g., by taking a picture of them, firing a virtual paintball at the person, or some other simulation of shooting), and more particularly to a wireless device and method by which an authorization is given to a game player to take a gaming action (e.g., "shoot", or game start) when they are within a specified range of the other person.

Wireless devices such as cellular phones now are becoming available with camera technology built into the phone. Such devices can be used to play games, such as an interactive photo "tag" type game described in patent application Ser. No. 10/743,487 filed Dec. 22, 2003, which is assigned to the Assignee of this invention. The contents of the '487 application are incorporated by reference herein. In the '487 application when a person takes a picture of a person playing the game, they "tag" the person who becomes IT and must chase the other players.

This invention can be used in photography-based "tag" type games, but also in other games as well, including "Assassin" or other shooting games, where a person "shoots" another person with a gaming device such as a paintball gun, laser-gun or other non-injurious device.

SUMMARY

A gaming server periodically receives location information from a plurality of distributed gaming devices, each of which is associated with a game player. Such devices can take the form of cellular telephones, or other wireless communications devices, which are equipped with a GPS transceiver. When the gaming server determines that a gaming device is within a predetermined range of another gaming device, it sends an authorization message such as an "in-range" message to one or both of the devices within range of each other. The users of the device(s) receiving the in-range message are then authorized to take a gaming action. Examples of such gaming action could be "shoot" the other user, e.g., by taking a picture of them, pointing a laser at them or some other "shooting" action that may be specified by the rules of the game. Other examples of the gaming action could be the start of the game, e.g., in a game of "pong".

The invention can be embodied as a method for controlling a game, comprising the steps of:

(a) periodically receiving geographical location of a plurality of game players at a gaming server;

(b) determining, from the geographical locations, whether any of the game players are within a specified range of one another, and, if the step of determining results in at lease one game player being within range of at least one other player, (c) sending an in-range message to at least one game player that is within the specified range of another game player, whereby the at least one game player may take an action in accordance with the rules of the came, such as, for example "shoot" or photograph another game player within the specified range.

The invention can also be embodied as a gaming server for authorizing an action in accordance with the rules of a game played by a plurality of game players. The gaming server comprises a processor and a memory storing a set of instructions for execution by the processor. The instructions include instructions for a) receiving current location information for the game players; b) computing distances between the game players; c) comparing the distances between the game players with a predetermined range R; and d) sending an authorization message (e.g., an "in-range message") to at least one game player whose distance to another game players is less than R. For example, the game player receiving the authorization message is now authorized to "shoot" the other game player.

The invention can also take the form of a wireless gaming device for use by a player in playing a game, e.g., a "shooting" game where one player "shoots" another player. The wireless gaming device comprises a processor, communications hardware and software for communicating with a gaming host on a packet switched network via a radio access network, and a receiver for determining the location of the wireless gaming device. The receiver will typically take the form of a Global Positioning System (GPS) satellite receiver. The gaming device further comprises gaming software executable by the processor comprising instructions periodically transmitting current position information for the gaming device to the gaming host and receiving messages from the gaming host. The device also includes a display displaying an authorization message (e.g., an "in-range" message) received from the gaming host when the wireless gaming device is within a predetermined range R of another player in a game. A gaming action is then allowed to occur (e.g., shoot or initiate a game). As another example, the "in-range" message could do something as simple as initiate a game of "Pong" between two players.

In illustrated embodiments, the gaming device comprises a cellular phone, which may come equipped with a camera. Other devices are possible. In one possible alternative, the gaming device may also be incorporated with the device that "shoots" the other players. Alternatively, the gaming device could communicate with the device that shoots the other player, e.g., using wireless protocols or via a cable.

While the preferred embodiments use known GPS technology as a means for determining the location of the gaming devices, other techniques could be used. For example, the gaming server could send queries to a server that determines or stores the location of wireless devices by means of known triangulation algorithms that are used to locate wireless devices such as cell phones, without the use of GPS. Such algorithms are based on signals received from the wireless devices at wireless network antennas or other cellular telephone infrastructure over an RF interface.

DETAILED DESCRIPTION OF PREFERRED EMBODIMENT

Figure 1:
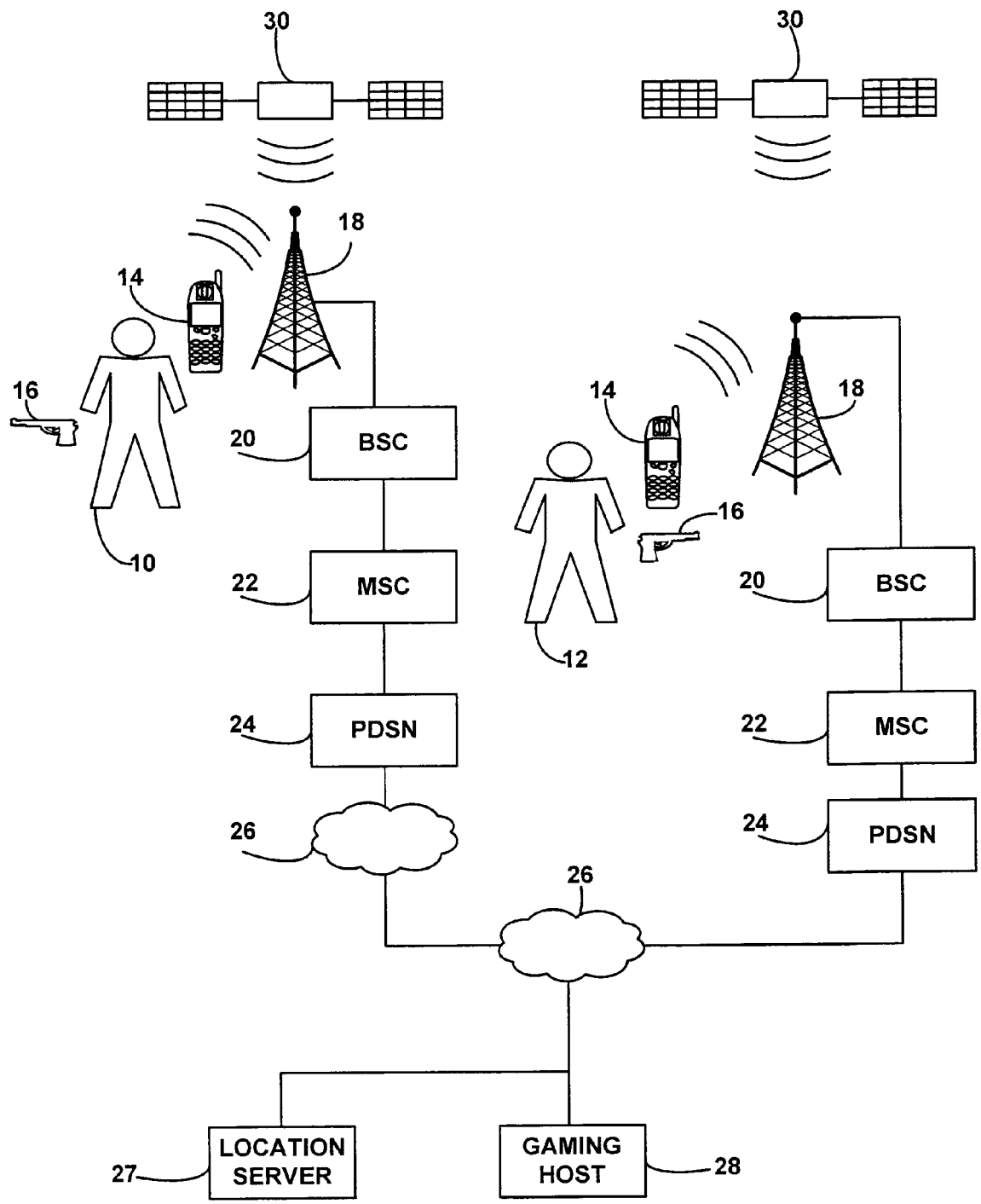
FIG. 1 is a illustration of a network environment in which several players play a shooting game, and showing the cellular communication devices, radio access network infrastructure and network which are used to communicate distance information to a gaming host. The gaming host responsively issues "in-range" or "out-of-range" messages periodically to the players to control the authorization of a "shoot" action.

FIG. 1 is a illustration of a network environment in which several game players 10 and 12 play a shooting game and in which authorization of gaming action, e.g., game on, a "shooting" or tagging action, or some other action, is based on geographic proximity of the players 10 and 12. The players each have a gaming device 14 which may take the form of a wireless communications device such as a cell phone, personal digital assistance, or dedicated gaming device. The device is used to communicate location information to a central gaming host system 28 over a radio access network infrastructure and packet switched network. The device 14 is also provided to display messages to the players, including an "in-range" or positive authorization message, and out-of-range messages.

The players 10 and 12 may also use additional game devices 16, which could take the form of a paint ball gun, laser device, camera, or other game apparatus. The game device 16 also could be incorporated into the cell phone or wireless communications device 14. For example, in a game of photo "tag", the game device could be a camera that is included in a cellular telephone. Or, the paint ball gun or other gaming device 16 could have a screen display, wireless communication capability, and GPS transceiver for communication with the central gaming host system 28 and displaying messages to the user, in which case the separate device 14 might not be needed.

The radio access network infrastructure includes known components for coupling a wireless device to a wireless service provider communications network 26, including a cellular communications antenna 18, a base station controller 20, mobile switching center 22 and packet data serving node 24. These details are conventional and therefore not described further. The packet data serving node 24 serves to couple communications from the radio network infrastructure to a packet switched network 26, which may be a cellular communications network service provider backbone Internet Protocol network or another intervening network, Internet, etc.

A gaming host system 28 is present on the network 26 and receives current location information for the game players 10 and 12 over the network 26. More particularly, the wireless devices 14 are equipped with GPS receivers. The GPS receivers determine the current location of the device by means of signals received from a constellation of orbiting GPS satellites 30, as is known in the art. The current GPS location from the receivers is stored locally in memory on the devices 14 and transmitted on a periodic basis the gaming host system 28. The gaming host system compares the location of all the players in the game and sends messages such as in-range or out-of range messages to the players in accordance with the proximity of the players and a predetermined range value R that defines the proximity required for two players to be in range of each other. The value of R could be user specified and stored in the gaming host system 28.

As noted earlier, geographical location of the devices 14 could be obtained by the host system sending query messages to a location server 27 which stores geographical location information for the players 10. The locations in the location server 27 could be determined from triangulation algorithms based on RF signals received from the devices 14 by a plurality of antennas 18 in the cellular network, as in known in the art.

Figure 2:
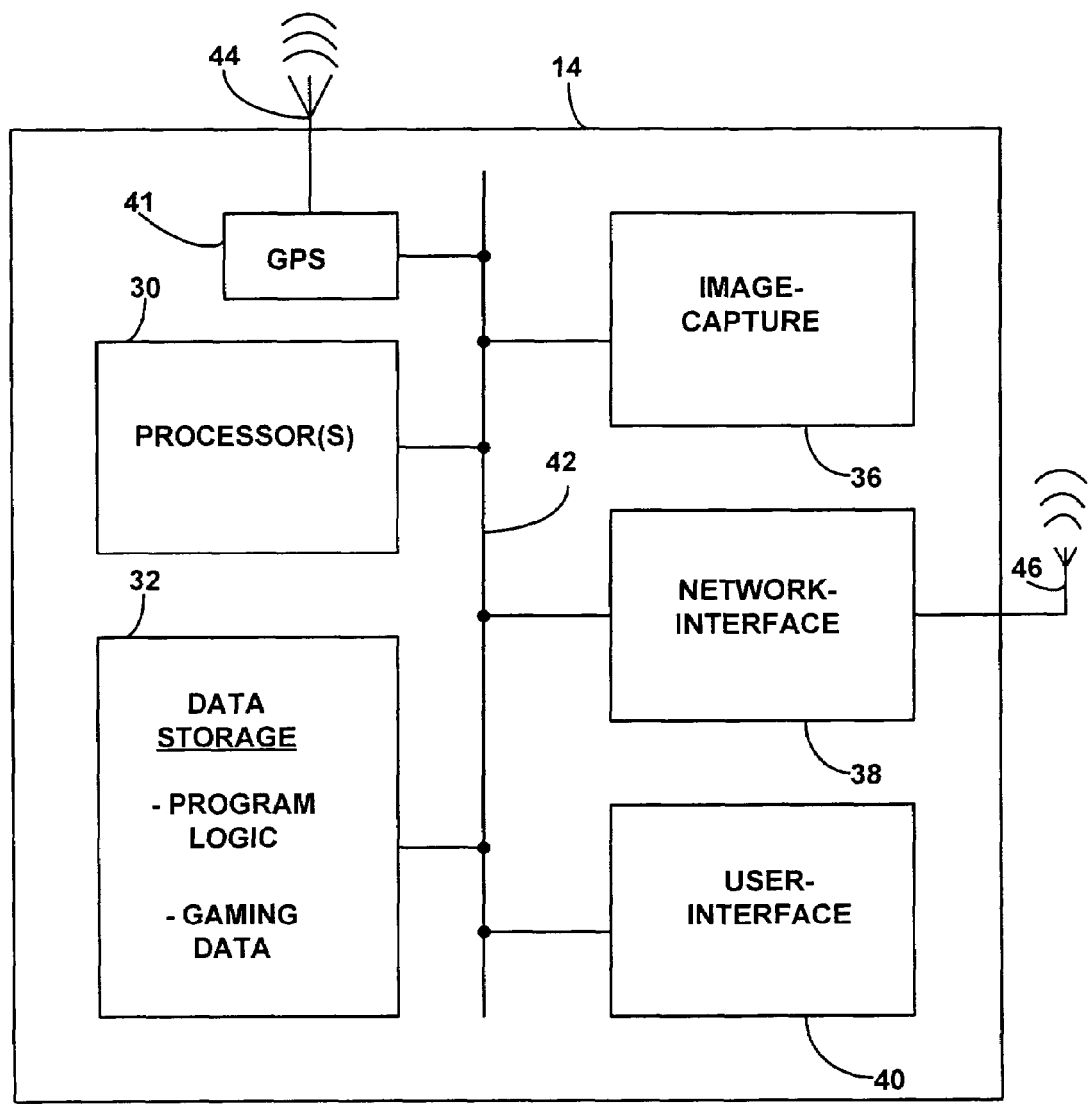
FIG. 2 is a simplified block diagram of a wireless communication device such as a cell phone which might be used as a gaming device in FIG. 1.

FIG. 2 is a simplified block diagram of a representative gaming device 14 in the form of a wireless communications device with a built in global positioning system (GPS) receiver. The Figure shows the functional components that the device 14 could include in an exemplary device. As shown, the gaming device 14 includes a processing segment 30, a data storage 32, an image-capturing segment 36, a network-interface segment 38, a user-interface segment 40 and a GPS receiver 41, all of which may be coupled together by a system bus or other mechanism 42. GPS receiver 41 has a GPS antenna that receives GPS signals from orbiting GPS satellites. The device also includes an antenna 46 for communicating over a radio interface with an antenna in a land-based radio access network, such as for example an antenna in a cellular telephone network.

In the exemplary embodiment, the processing segment 30 preferably comprises one or more programmable general purpose processors, such as an Intel® Centro™ processor for instance. However, the processing segment 30 could also or instead comprise one or more specialized processors, such as application specific integrated circuits (ASICs) for instance.

Data storage 32, in turn, may comprise volatile and/or non-volatile storage (such as Flash memory, for instance) and could be integrated in whole or in part with processor segment 30. Data storage 32 preferably holds program instructions executable by processing segment 30 to carry out various functions described herein. (Alternatively, the functions could be carried out in other ways, such as by firmware and/or by hardware for instance.) Further data storage 32 functions to hold gaming data, such as photos and player information for instance, location data, etc.

Image-capturing segment 36 functions to capture an image of a subject. As such, the image-capturing segment 36 will preferably include features (not shown) that are commonly found in a digital camera, such as lens for receiving light that defines the image, a flash for illuminating the scene being photographed, and a mechanism to establish a digital representation of the image. The mechanism may include a CCD or CMOS image sensor array, for instance, which transforms light energy into analog pixel information, and a digitizer that establishes a digital representations of the pixel information. Such devices are known and found in inexpensive digital cameras. The image-capturing segment 36 may then work cooperatively with the processing segment 30, passing an array of the digital pixel representations to the processing segment for storage in a digital image file, and for handling.

Network-interface segment 38 functions to facilitate communication via network wireless radio access network infrastructure of FIG. 1 with other entities, such as game host 28, for instance. As such, network-interface segment 30 can take various forms, depending on the manner of communication. By way of example, if gaming device 14 will engage in cellular wireless communication, network-interface segment 38 may comprise a cellular communication chipset such as Qualcomm MSM® chipset for instance, as well as an antenna 46. Such a chipset would be arranged to communicate over an air interface according to an agreed protocol, such as CDMA, TDMA, GSM, 802.11 or Bluetooth, for instance, in a manner well known in the art. As another example, if gaming device 14 will engage in IP communication over network 26 with an entity such as game host 28, network-interface segment 38 would preferably include an IP stack. Similarly, if gaming device 14 will engage in other sorts of communication, network-interface segment 38 will be arranged to facilitate the communication. Note that some functions of network interface 38 could be carried out by processing segment 30, e.g., as program logic.

User-interface segment 40, in turn, functions to facilitate interaction with the player operating the gaming device. In the exemplary embodiment, the user-interface segment 40 will include a display screen (e.g., an LCD screen) for presenting digital images and for presenting text-base and/or graphics-based menus or prompts, and messages such as "in-range", "authorized", "out of range", etc. Further, user-interface segment 40 preferably includes one or more input mechanisms, such as buttons or a touch-sensitive display. The user-interface segment 40 could include other components as well.

In the exemplary embodiment, each gaming device 14/16 is identified by a unique device identifier, which could take various forms. For example, the device identifier could be a network access identifier (NAI), as defined by well known RFC 2486, or a mobile identification number (MIN). Further, each player operating a gaming device preferably has a player name, which could be the player's actual name or a nickname to be used in gaming. In representative gaming device 14, the device identifier and player name may be stored in data storage 32. Alternatively, the player could enter a player name when registering the play in a given game.

Figure 3A:
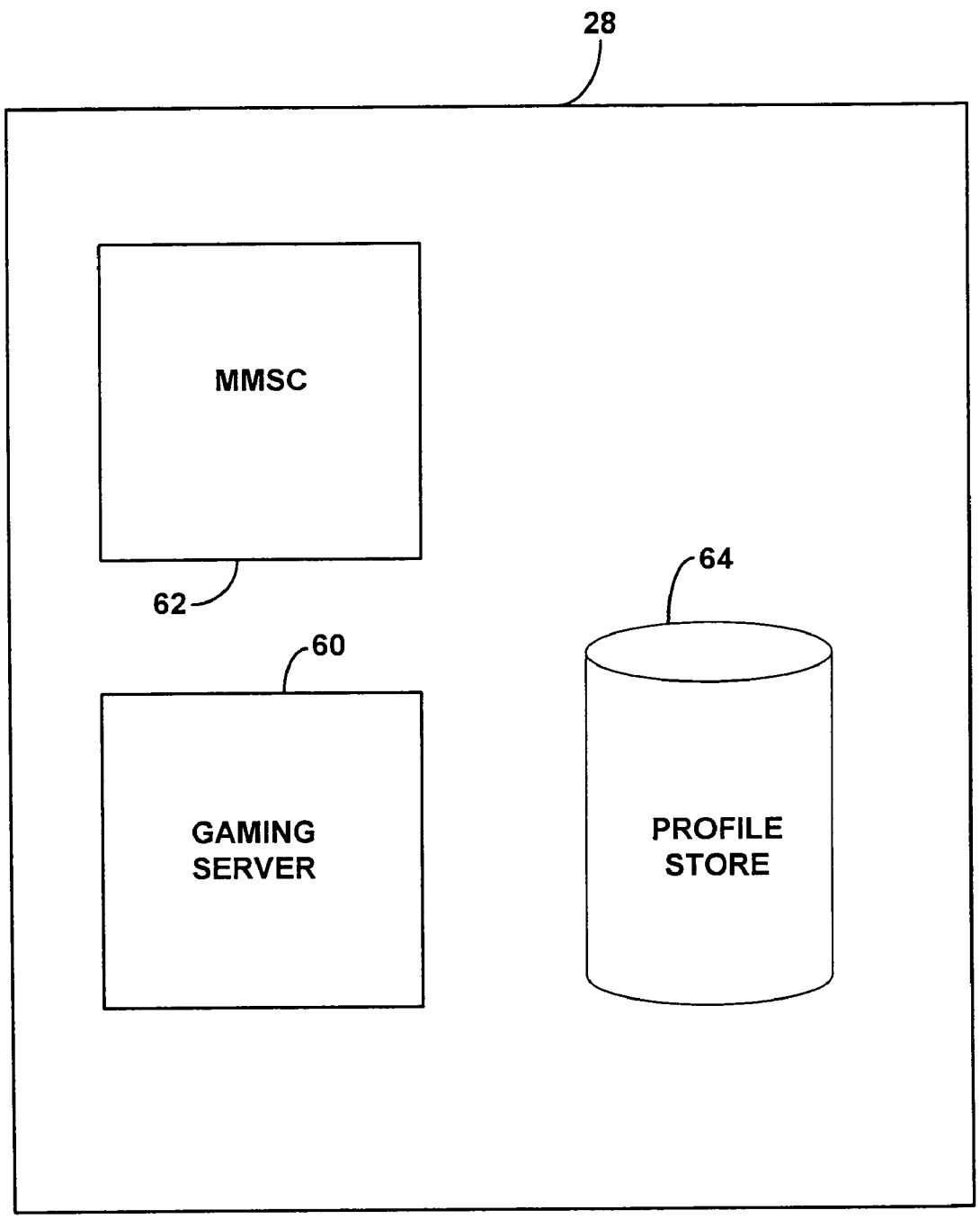
FIG. 3A is a simplified block diagram of a gaming host of FIG. 1.
Figure 3B:
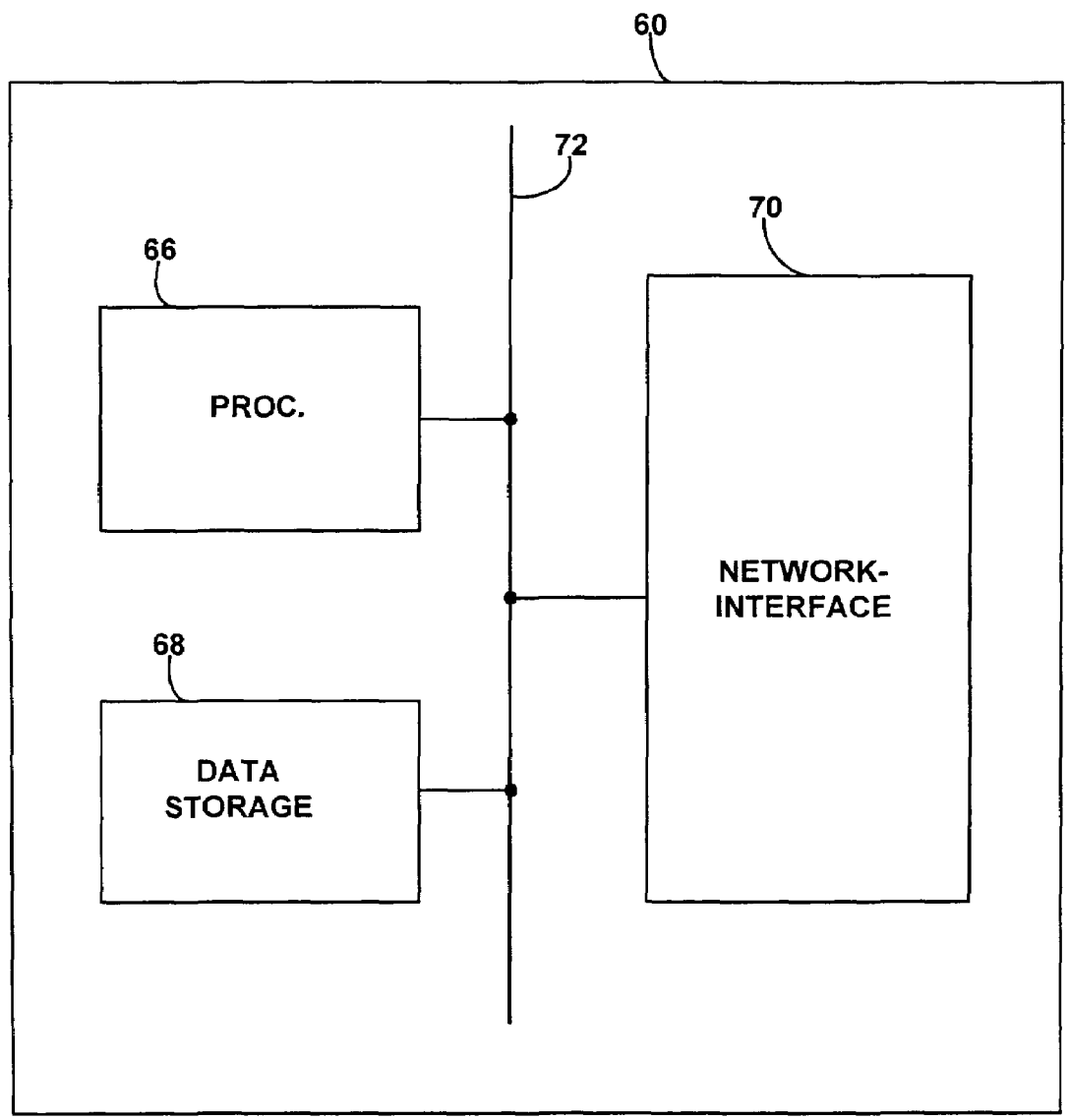
FIG. 3B is a simplified block diagram of a gaming server of FIG. 3A.

Referring now to FIG. 3A, the gaming host 28 of FIG. 1 is shown in further detail. The game host system 28 includes a gaming server 60, a multimedia messaging service center MMSC 62, and a profile store 64, each of which could sit at a respective address on the network 26. Although FIG. 3A depicts these components within a box, the components may or may not be located in a common entity on the network 26. The gaming server 60 includes intelligence in the form of machine readable instructions to determine proximity of gaming devices and responsively generate in-range and out-of range messages. As such, the gaming server 60 will function to manage participant data, to send and receive messages to gaming devices, and to otherwise facilitate and manage game play. For example, if a player "shoots" another player but the player's current status is not "in range", the server may invalidate the shooting action, assess a penalty, disqualify the player, or take other action. To carry out these functions, as shown in FIG. 3B, the gaming server 60 preferably includes a processing segment 66, data storage 68 and a network interface 70, which may be coupled together by a system bus or other mechanism 72. The gaming server 60 could take the form of a programmed general purpose computer.

The processing segment 66 may comprise one or more general purpose processor and/or dedicated processors. Data storage 68 may comprise volatile and/or non-volatile memory, which could be integrated in whole or in part with processing segment 66. Data storage 68 preferably holds program instructions executable by processing segment 66 to carry out various functions described herein. (Alternatively, the functions could be carried out in other ways such as by firmware or hardware or by human operator). Further data storage 68 may hold gaming data, such as participant data, location data, game status information, range R data, player status data, etc.

In an exemplary embodiment, the gaming server 60 may communicate with the gaming devices according to any agreed protocol, whether proprietary or standard. For instance, the gaming devices could include an HTTP client application, such as a web browser, and the gaming server could include an HTTP server application. The HTTP clients could then interact with the HTTP server through convention HTTP messaging techniques. Other messaging techniques could be SMS messaging formats, email, or other. Further, if the gaming devices are wireless mobile devices such as cell phones equipped with a camera, the gaming server 60 could exchange photos and other data (e.g., signal information, location information, etc.) with the gaming devices via multimedia messaging service (MMS) protocol.

According to MMS, a mobile device can send data to another entity by send an HTTP POST message (via a WAP gateway for instance) to an MMSC, including the message an IP address or other identifier of the destination. The MMSC would then forward the data to that destination. On the other hand, a network entity can send data to a mobile device by sending an MMS message to the MMSC, including the MMS message an identifier of the mobile device (e.g., an NAI or MIN for instance). The MMSC would then store the data under an assigned message number and send the message number to the mobile device in a specially coded SMS message. Upon receipt of the specially coded SMS message, the mobile device would then send an HTTP request to the MMSC, requesting the data stored under the message number, and the MMSC would provide the data in an HTTP response message.

In the exemplary embodiment, gaming server 60 will also be arranged to facilitate game setup, by configuring gaming devices with applicable gaming logic and registering participants to play. In particular, gaming server 60 may maintain in data storage 68, a client application that a gaming device will run in order to participate in the game, and gaming server 60 may host a game-setup web site through which gaming devices can download the application and players can register to participate in a game. Further, gaming service 60 may refer to profile store 64 to validate players who seek to join a game, and to determine relevant device capabilities (e.g., so as to send a proper version of the client application).

Still further, the gaming server 60 can be arranged to monitor participation in a given game and to remove inactive participants from the game. For instance, gaming server 60 could be arranged to send periodic keepalive messages (e.g., PING or SIG messages) to participants during a game and to remove from the game any participating device that does not respond to a threshold number of keepalive messages or within a threshold period of time.

While various kinds of messages can be exchanged between the game devices and the gaming server, for present purposes the significant message is the relaying of positional information to the gaming server and the gaming server 60 responsively issues "in-range" or "out-of-range" messages periodically to the players to control the authorization of a "shoot" action.

Figure 4:
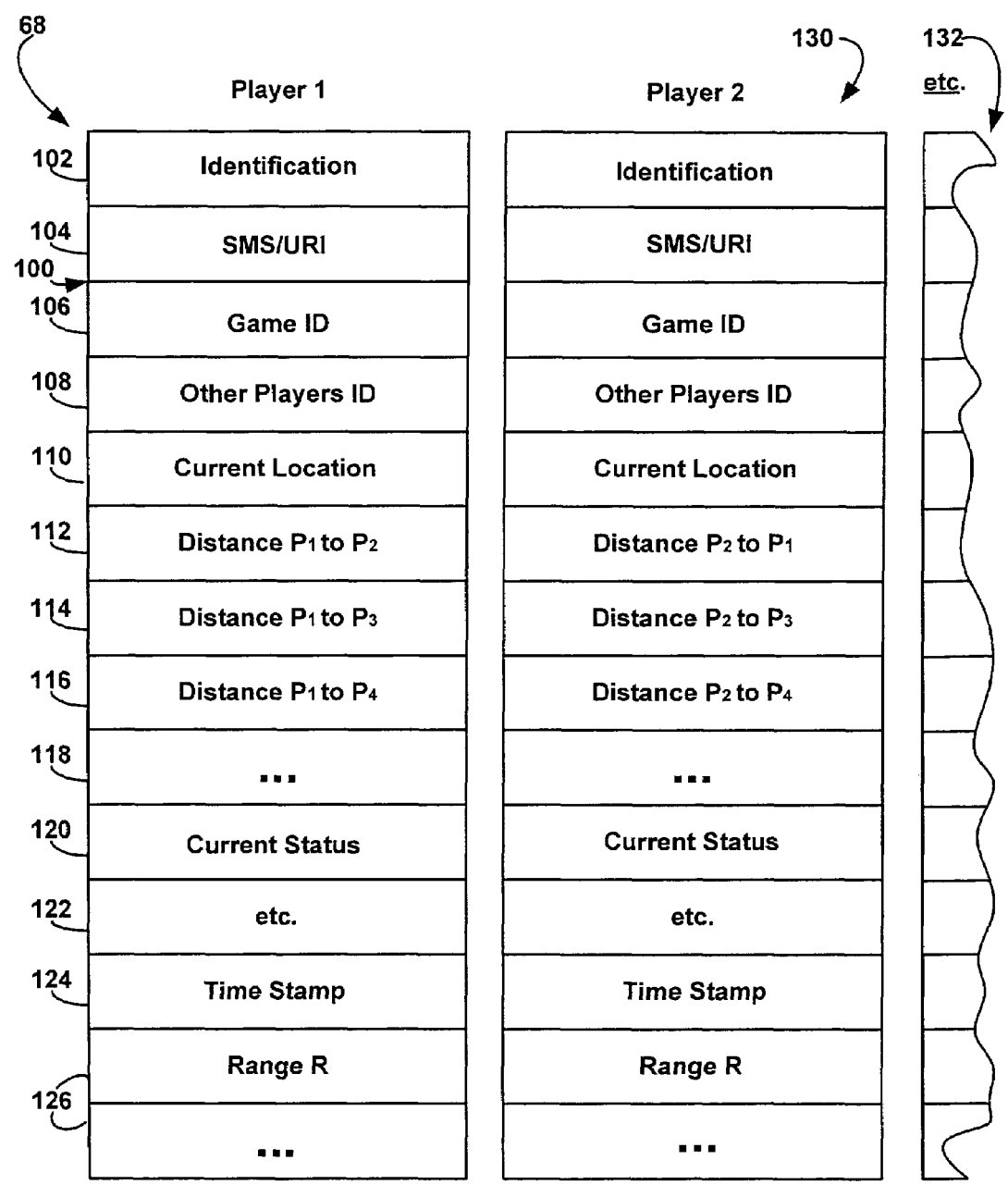
FIG. 4 is an illustration of memory blocks in the data storage of FIG. 3B, showing a set of fields in memory storing player profile and game status information for the plurality of game players in FIG. 1.

FIG. 4 is an illustration of memory blocks 130, 132 in the data storage 68 of FIG. 3B, showing a set of fields 100 in the memory where player profile and game status information is stored for the plurality of game players in FIG. 1. The fields can include a field 102 containing identification of the player (e.g., player number or name), a field 104 containing network address (URI), SMS address, phone number, or other address where messages can be sent to the gaming device. The fields include field 106 for a game ID, a field 108 for storing the ID information for other players in the game, a field 110 for storing current location of the device; a field 112 containing the distance between player 1 (P1) and player 2 (P2), a field 114 for storing distance from player P1 and P3, a field 116 for storing distance from P1 to P4, and similar fields 118 for the other players.

The fields 100 could include a field 120 for storing the current status of the player (e.g., in range of P2, P4; out of range of all players, etc. Still further fields could be provided 122, including a time stamp field for recording times when a player is within range of specified other players, times when shooting action occurs, or other applicable times. Another field might be a field for Range R, that is, the distance within which a player must be to another player to be in range and thus authorized to take a gaming action, e.g. shoot or tag another player.

As shown in FIG. 4, similar fields are present for player 2 (130), player 3 (132) and all the other players in the game.

Figure 5:
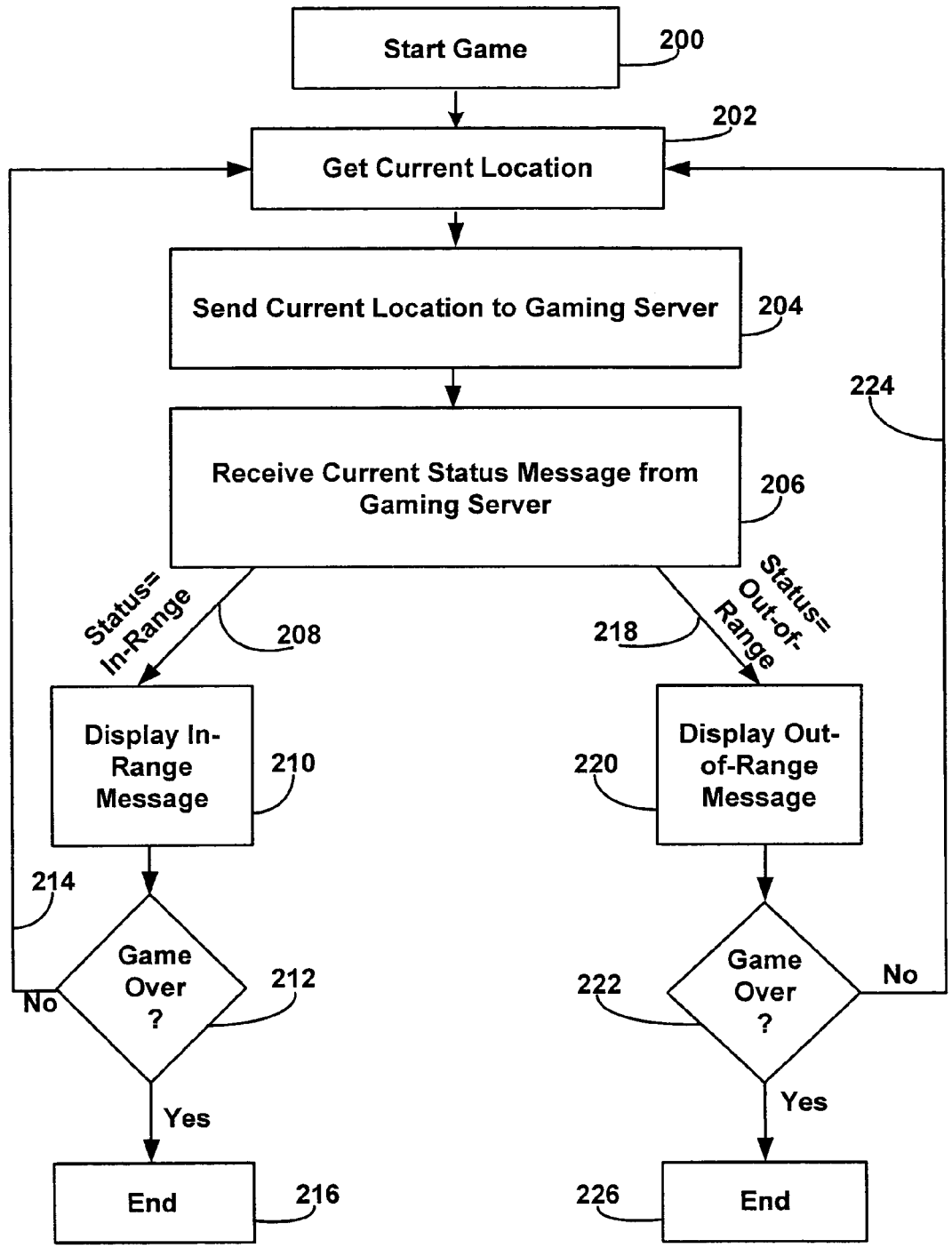
FIG. 5 is a flow chart showing a series of process steps executing in the processor of FIG. 2 in the gaming device, showing the steps of display of in-range and out-of range messages which indicate whether the player is authorized to shoot another player.

FIG. 5 is a flow chart showing a series of process steps executing in the processor of FIG. 2 in the gaming device 14, showing the steps of display of in-range and out-of range messages which indicate whether the player is authorized to execute a gaming action, such as shoot or tag another player. At step 200, the game is started. At step 202, the gaming device 14 obtains its current location from its GPS receiver and stores the current location in memory.

At step 204, the processor in the gaming device 14 generates a message for the gaming server. The message includes the current location stored at step 202. The message is sent via the radio access network and network 26 (FIG. 1) to the gaming server in the host system 28.

At step 206, the gaming server sends a current status message to the gaming device. In this invention, the status message will generally be of one of two types of messages—an authorization message such as an in-range message, or a non-authorization message, such as an out of range message. If the status of the device is that it is within range of another device, the processing branches as shown at 208 and the device displays an in-range or authorization message 210 on the user interface of the gaming device. The user is thus allowed to take a gaming action, such as "shoot" another game player, take their picture, or do some other task. At step 212, the processor checks to see if the game is over, and if not the process loops back as shown at 214 to step 202 and the process repeats. If the game is over, the process ends 216.

If, at step 206, the status message is "out-of-range" or "not authorized", as indicated at 218 the processing proceeds to step 220 wherein an "out-of range" message is displayed. The processing checks to see if the game is over and if not the processing loops back as indicated at 224 to step 202. If at 222 the game is over, the process ends 226.

Figure 6A:
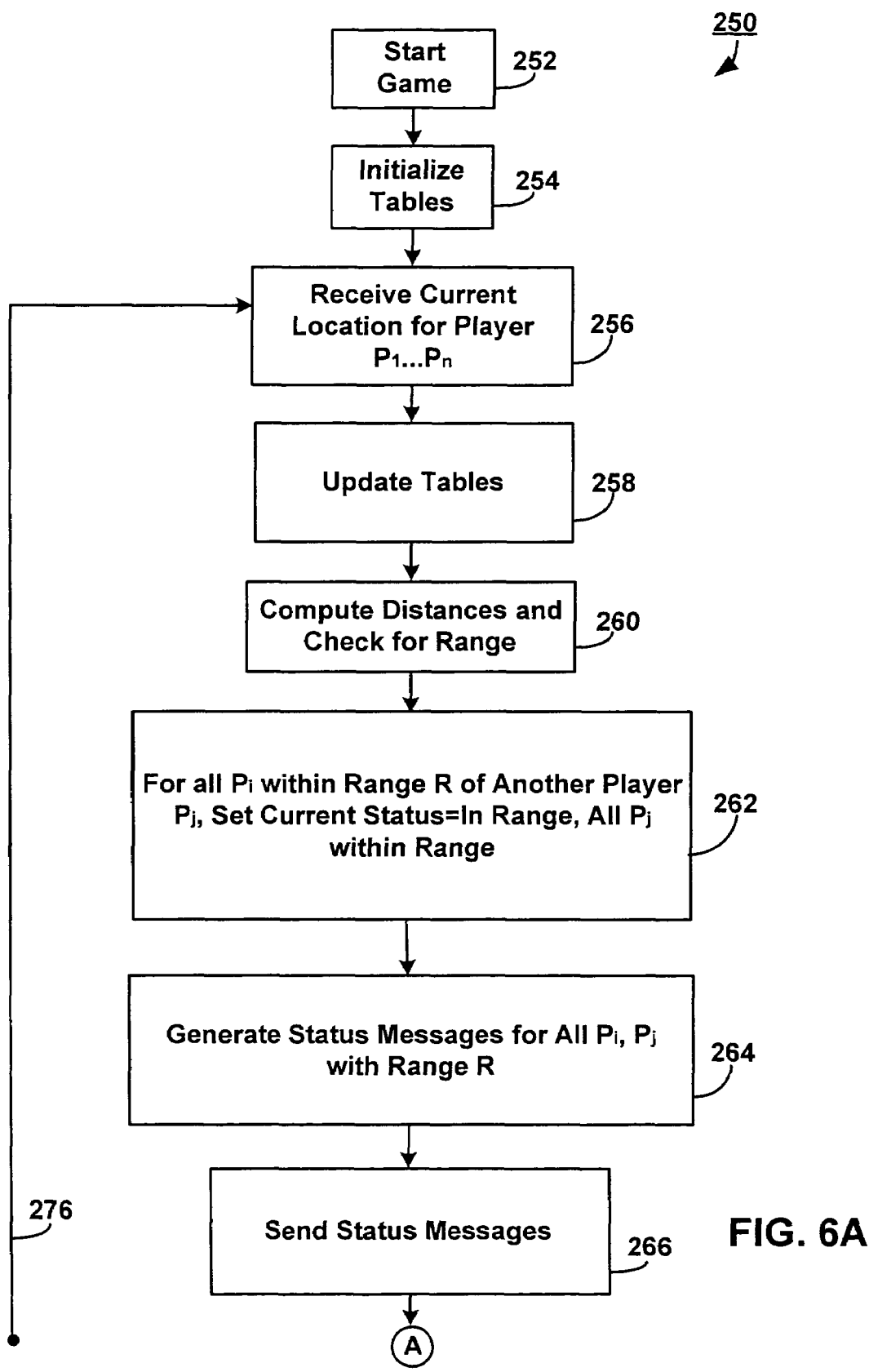
FIGS. 6A and 6B is a flow chart showing a series of process steps executing in the processor of the gaming server, wherein the geographic location of a plurality of players is processed to determine which players are in range of other players, and responsively sending "in-range" and "out-of-range" messages to the players.
Figure 6B:
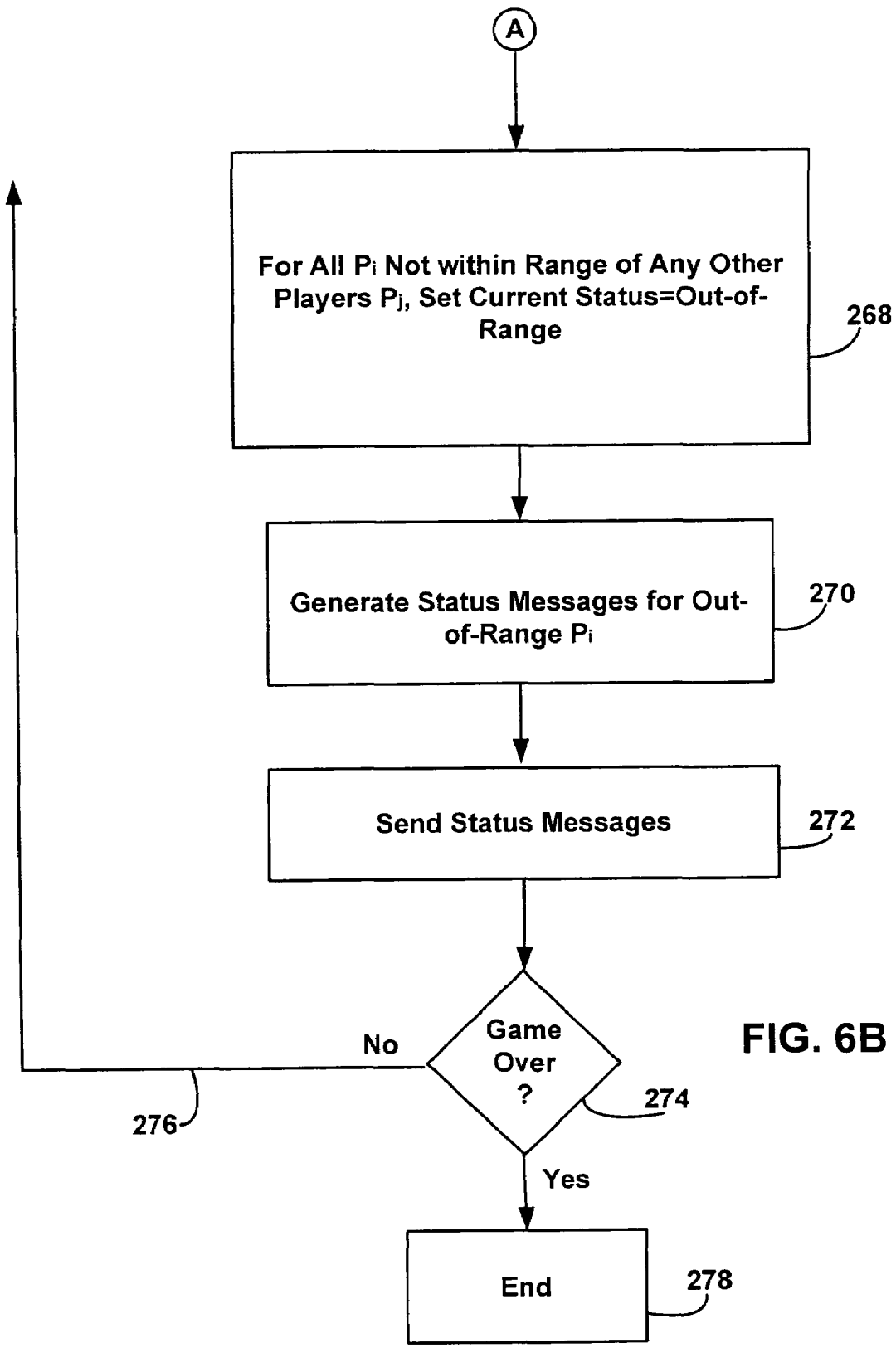

FIGS. 6A and 6B is a flow chart showing a series of process steps executing in the processor of the gaming server, wherein the geographic location of a plurality of players is processed to determine which players are in range of other players, and responsively sending "in-range" and "out-of-range" messages to the players.

At step 252, the game is started. This step could be in response to some game initiation message sent from one of the players, or in any other fashion.

At step 252, the tables (FIG. 4) are initialized with the game and player information.

At step 256, the gaming server begins to receive the current location messages from all the players P1 . . . PN, and more particularly, from the gaming devices used by each player (step 204 in FIG. 5).

At step 258, the gaming server updates its tables (FIG. 4) to store the current location for each player in the appropriate field in memory.

At step 260, the gaming server processes each of the location fields and determines the distances from each game player to each of the other game player. The distances are then compared to the stored value of minimum range R to determine which players, if any, are within range of any other player.

At step 262, for all players $P_i$ within range R of another player $P_j$, the gaming server sets the current status field to be "in-range", and identifies the other player(s) that are within the range.

At step 264, the processor in the gaming server generates an in-range or "authorized" status message for each player that is within range of another player, and includes in the message the name or ID of the other player(s).

At step 266, the processor sends the in-range status messages to the players determined in step 262.

At step 268, for all players $P_i$ that are not within range R of another player $P_j$, the processor sets the current status of these players as "out-of-range." At step 270, the processor generates status range for these out-of-range players and at step 272 sends these status messages to the out of range players.

At step 274, the processor checks to see if the game is over, and if not the process loops back as indicated at step 276 back to step 256 and the process continues until the game is over at 278 (e.g., no other players are left, no players are within range of any other players for a threshold duration, or as determined by score or game rule).

From the above description, it will be appreciated that we have described a gaming server 60 which periodically receives location information from a plurality of distributed gaming devices 14/16, each of which is associated with a game player 10. Such devices can take the form of cellular telephones, or other wireless communications devices, which are equipped with a GPS transceiver. When the gaming server determines that a gaming device 14 is within a predetermined range of another gaming device, it sends an authorization message such as an "in-range" message to one or all of the devices within range of each other. The users of the device(s) receiving the in-range message are then authorized to take a gaming action such as "shoot" the other user, e.g., by taking a picture of them, pointing a laser at them or some other "shooting" action that may be specified by the rules of the game.

The invention can be embodied as a method for controlling a game, comprising the steps of:

(a) periodically receiving geographical location of a plurality of game players at a gaming server (step 256 in FIG. 6A);

(b) determining, from the geographical locations, whether any of the game players are within a specified range of one another (steps 260 and 262 in FIG. 6A), and, if the step of determining results in at lease one game player being within range of at least one other player, (c) sending an in-range message to at least one game player that is within the specified range of another game player (steps 264 and 266), whereby the at least one game player receiving the message may take an action in accordance with the rules of the came, such as, for example "shoot" or photograph another game player within the specified range.

Variations from the disclosed embodiments are contemplated without departure from the scope of the invention. Implementation details in the game server and the gaming devices are not important, and may change depending on the hardware configuration, game rules, communications protocols and mechanisms used, etc. The scope of the invention is to be determined by reference to the appended claims.

I claim:

1. A method for controlling a gaming action for a game comprising the steps of:
   periodically receiving geographical locations of a plurality of game players from wireless communication devices carried by the plurality of game players;
   determining, from the geographical locations, whether any of the game players are within a specified range of one another, and, if the step of determining results in at least one game player being within the specified range of at least one other game player,
   sending an in-range message to the at least one game player's wireless communication device that is within the specified range of the at least one other game player, whereby the at least one game player is authorized to take the gaming action in accordance with rules of the game;
   wherein the at least one game player operates a shooting device and the wireless communication device, the shooting device communicatively coupled to the wireless communication device, and wherein the shooting device is rendered from an inoperative state to an operative state upon receipt of the in-range message.

2. The method of claim 1, wherein the method further comprises the steps of sending an out-of-range message to at least one game player that is not within the specified range of another game player.

3. The method of claim 1, wherein the steps of receiving, determining and sending are performed by a game host system on a packet switched network coupled to a radio access network, and wherein the in-range message is sent via the radio access network to the at least one game player.

4. The method of claim 3, wherein the wireless communications device includes a built-in global position system (GPS) receiver.

5. The method of claim 4, wherein the wireless communications device comprises a cellular telephone.

6. The method of claim 5, wherein the cellular telephone further comprises a camera.

7. A gaming server for authorizing an action in accordance with the rules of a game played by a plurality of game players, the game players using a shooting device communicatively coupled to a wireless communications device, comprising:
   a processor; and
   a memory storing a set of instructions for execution by the processor, the instructions:
   a) receiving current location information for the game players from wireless communication devices carried by the plurality of game players;
   b) computing distances between the game players;
   c) comparing the distances between the game players with a predetermined range R; and
   d) sending an in-range message to at least one game player's wireless communications device whose distance to another game player is less than R wherein the shooting device of the at least one game player is rendered from an inoperative state to an operative state upon receipt of the in-range message.

8. The gaming server of claim 7, wherein the gaming server is on a packet switched network and coupled to a radio access network, and wherein the in-range message is sent via the radio access network to the at least one game player.

9. The gaming server of claim 7, wherein instructions a), b), c) and d) execute in a loop during the game.

10. The gaming server of claim 7, wherein the instructions further comprise instructions e) sending an out-of-range message to game players who are not currently within range R of any other player in the game.

11. A wireless gaming device comprising:
   a processor;
   communications hardware and software for communicating with a gaming host on a packet switched network via a radio access network;
   a receiver for determining the location of the wireless gaming device;
   gaming software executable by the processor comprising instructions periodically transmitting current position information for the gaming device to the gaming host and receiving messages from the gaming host using the communications hardware and software; and
   a display displaying an in-range message received from the gaming host via the communications hardware and software when the wireless gaming device is within a predetermined range R of another player in a game;
   wherein the wireless gaming device is communicatively coupled to a shooting device and wherein the shooting device is rendered from an inoperative state to an operative state upon receipt of the in-range message.

12. The wireless gaming device of claim 11, wherein the wireless gaming device comprises a cellular telephone.

13. The wireless gaming device of claim 12, wherein the wireless gaming device further comprises a camera.

14. The wireless gaming device of claim 13, wherein the shooting device comprises the camera.

* * * * *